July 23, 1963
L. E. GODYCKI ET AL
3,098,803
THIN MAGNETIC FILM
Filed June 23, 1960

INVENTORS
LUDWIG E. GODYCKI
RONALD G. STEVENS
IGNATIUS TSU
BY Walter Katz
ATTORNEY United States Patent Office 3,098,803

Patented July 23, 1963

3,098,803
THIN MAGNETIC FILM

Ludwig E. Godycki, Cold Spring, and Ronald G. Stevens and Ignatius Tsu, Beacon, N.Y., assignors to International Business Machines Corporation, New York, N.Y., a corporation of New York Filed June 23, 1960, Ser. No. 38,284
4 Claims. (Cl. 204—38)

This invention relates to thin magnetic films and more particularly to a heat treating method for preparing such films having improved magnetic properties for use in magnetic storage devices.

Certain alloys in the form of thin metallic films, of the order of 2,000 A. thick, are known to exhibit the rectangular hysteresis loop useful in application in memory storage devices in computer circuitry. Thin magnetic films may be produced by high vacuum evaporation or electrodeposition of suitable ferromagnetic material, such as 80–20 nickel-iron alloy, onto suitable support substrates. As those skilled in the art recognize, some of the properties which describe the usefulness of such elements include low coercive forces and low switching constants. In addition, it is known that it is essential that there be good adhesion between the film and the substrate.

What is described herein is a process for preparing thin magnetic films having the aforementioned advantageous magnetic and mechanical properties. In general the process comprises electrolessly depositing a layer of nickel or cobalt onto a non-metallic substrate such as glass or plastic and thereafter depositing a magnetic alloy, such as nickel-iron or cobalt-iron alloys onto said electrolessly deposited layer. The advantageous properties in the magnetic film, in particular, the low coercive forces, low switching constants and excellent adhesion, are achieved in the present invention, by subjecting the electrolessly deposited layer to a baking treatment for a prescribed time interval.

The process of electroless plating, otherwise called plating by chemical reduction, is well known in the art and is described in detail in U.S. Patent 2,836,510. The process comprises depositing metallic nickel or cobalt from an aqueous solution consisting essentially of their salt and a hypophosphite reducing agent. The plating bath is usually operated at a temperature of about 60–90° C. or higher in the presence of certain catalytic metals which initiate the oxidation-reduction reaction necessary for the plating action.

A broad object of this invention is to provide improved thin magnetic films having properties suitable for magnetic storage devices.

Another object of the present invention is to provide thin magnetic film elements having a coercive force of 5 oersteds or less and switching constants of about 0.02 oersted-microsecond, which elements exhibit good adhesion between the magnetic layer and a non-magnetic substrate.

A further object is to prepare improved thin magnetic films by first electrolessly depositing a metallic layer on a non-metallic substrate, baking the electrolessly deposited metallic layer within a prescribed time interval and thereafter electroplating a thin magnetic layer thereon.

The foregoing and other objects, features and advantages of the invention will be apparent from the following more particular description of preferred embodiments of the invention, as illustrated in the accompanying drawing:

In accordance with the preferred embodiment of the present invention, a clean, dry, hot glass slide 1 is inserted into a sensitizer solution, such as one composed of 0.1% by weight of an aqueous solution of $SnCl_2$, rinsed and additionally sensitized with 0.1% by weight of $PdCl_2$ solution. The thus treated glass slide then is immersed in an electroless nickel or cobalt plating bath, such as one having the following typical composition and bath parameters: 30 g./l. $NiCl_2 \cdot 6H_2O$, 10 g./l. $NaH_2PO_2 \cdot 2H_2O$, 50 g./l. $NH_4Cl$., 100 g./l. sodium citrate, pH=7.5–8 ($NH_4OH$), bath temperature=95° C. The immersion time varies considerably, but usually between 4 to 10 seconds is sufficient to form an adherent layer of electrolessly deposited nickel 2 on the glass substrate. The nickel layer then is washed free of excess solution and baked at elevated temperatures for a prescribed period of time, as will be described in detail hereinafter.

Following the electrolysis plating, a magnetic alloy, such as one composed of 80–20 nickel-iron in percent by weight, is deposited on the nickel layer. An electroplating bath having the following composition gives excellent results although others known in the art may be used as well. 10 g./l. $FeSO_4 \cdot 7H_2O$, 200 g./l. $NiCl_2 \cdot 6H_2O$, 25 g./l. $H_3BO_3$, 0.84 g./l. saccharin, 0.42 g./l. sodium lauryl sulfate. Plating is carried out at a pH of 2.85 at room temperature for about one minute, providing a nickel-iron layer in the order of 2,000 A. thick.

Figure 2:
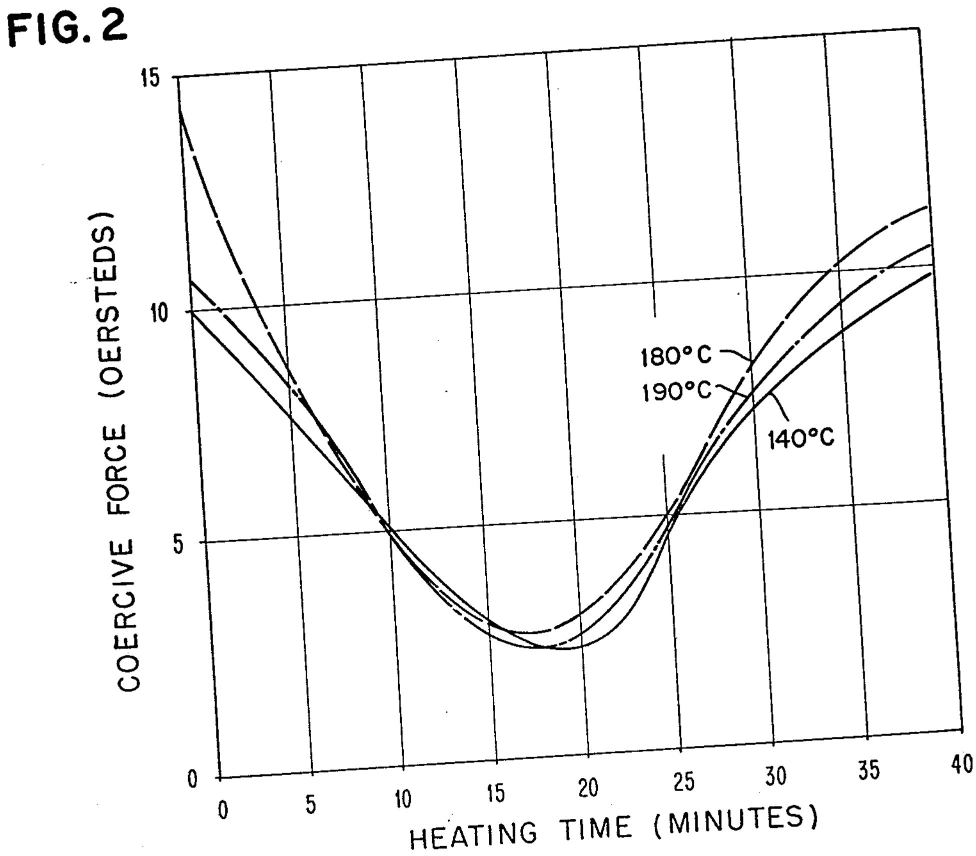
FIGURE 2 is a plot of coercive force versus baking time at various baking temperatures.
Figure 1:
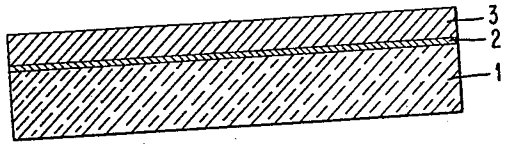
FIGURE 1 is a schematic diagram showing the several layers of the thin magnetic film element of the present invention.

As shown in FIGURE 2, the coercive force of the resultant thin magnetic film is greatly influenced by the time of baking of the electrolessly deposited layer. In particular, it is seen that the baking should be carried out for a period of time between 10 and 25 minutes to produce a film having coercive forces useable in application in memory devices in computers. The baking is carried out at a temperature between 130–190° C. A baking time of about 17 minutes at 140° C. produces optimum results.

The switching constants of the films prepared according to the process described herein are about 0.02 oersted-microsecond, an exceedingly low value, while those prepared by baking for shorter and longer times than those prescribed herein show correspondingly higher switching constants.

The magnetic films thus prepared exhibit excellent adhesion to the non-metallic substrate layer and a well oriented rectangular hysteresis loop characteristic.

While the mechanism underlying the relationship between the baking time and the magnetic properties of these films is not well understood, it is believed to be related to microscopic changes in the structure of the nickel layer as the heating time is varied.

While the invention has been particularly shown and described with reference to preferred embodiments thereof, it will be understood by those skilled in the art that various changes in form and details may be made therein without departing from the spirit and scope of the invention.

What is claimed is:

1. A process of making a bistable magnetic memory element exhibiting a coercive force of less than 5 oersteds and a switching constant of approximately 0.02 oersted-microsecond comprising the steps of:

(1) immersing a non-magnetic substrate in an electroless nickel plating bath having the composition:

30 g./l. $NiCl \cdot 6H_2O$,
10 g./l. $NaH_2PO_2 \cdot 2H_2O$,
50 g./l. $NH_4Cl$,
100 g./l. sodium citrate,
said bath having a pH of 7.5–8.0 and a temperature of 95° C., for between 4 to 10 seconds to form an adherent layer of electrolessly deposited nickel on said substrate;

(2) rinsing the electrolessly deposited nickel layer to remove excess plating bath solution;

(3) baking the substrate with the electrolessly deposited nickel layer at a temperature between 130°–190° C. for 10 to 25 minutes;

(4) thereafter subjecting the baked electrolessly deposited nickel layer to electrolytic action in an electroplating bath having the composition:

10 g./l. $FeSO_4 \cdot 7H_2O$,
200 g./l. $NiCl_2 \cdot 6H_2O$,
25 g./l. $H_3BO_3$,
0.84 g./l. saccharin,
0.42 g./l. sodium lauryl sulfate, said electroplating bath having a pH of 2.85 and being maintained at room temperature, for about 1 minute to deposit a nickel-iron alloy having a thickness in the order of 2000 A. on the electrolessly deposited nickel layer.

2. The process set forth in claim 1 wherein the nonmetallic substrate is glass.

3. The process set forth in claim 1 wherein the baking is carried out at 140° C. for 17 minutes.

4. Bistable magnetic memory elements produced according to the process of claim 1.

References Cited in the file of this patent

UNITED STATES PATENTS 2,430,581 Pessel ____________ Nov. 11, 1947

OTHER REFERENCES

TSU, "Preparation of Adherent Thin Magnetic Films by Chemical Reduction," IBM Technical Disclosure Bulletin, vol. 2, No. 3, October 1959, p. 36.